United States Patent [19]
Beaman et al.

[11] Patent Number: 5,297,409
[45] Date of Patent: Mar. 29, 1994

[54] WORKHARDENING HIGH-STRENGTH STEEL AIRCRAFT COMPONENTS

[76] Inventors: Danny L. Beaman, 25308 - 168th Pl. SE., Kent, Wash. 98042; Kenneth R. Christie, 2815 - 164th Pl. SE., Bothell, Wash. 98012; Dennis M. Cordy, 25730 - 115th Ave. SE., No. B202, Kent, Wash. 98031; Craig W. Graham, 26515 - 186th Pl. SE., Kent, Wash. 98042; Steven W. Lightle, 9538 S. 213th, Kent, Wash. 98031; Michael L. Watts, 6718 - 50th Ave. E., Tacoma, Wash. 98443

[21] Appl. No.: 902,248

[22] Filed: Jun. 22, 1992

[51] Int. Cl.5 .............................................. B21D 39/08
[52] U.S. Cl. ............................................ 72/42; 72/370; 29/446
[58] Field of Search .................... 72/42, 370, 391.4; 29/446, 90.01

[56] References Cited

U.S. PATENT DOCUMENTS

| | | | |
|---|---|---|---|
| 3,575,858 | 4/1971 | Adair et al. | 72/42 |
| 3,843,529 | 10/1974 | Bertrand | 72/42 |
| 4,088,585 | 5/1978 | Karpen | 72/42 |
| 4,129,028 | 12/1978 | Leftheris et al. | 72/370 |
| 4,411,145 | 10/1983 | Lewis et al. | 72/42 |
| 4,416,132 | 11/1983 | Sargent | 72/42 |
| 4,433,567 | 2/1984 | Mead | 72/370 |
| 4,471,643 | 9/1984 | Champoux et al. | 29/446 |
| 4,771,627 | 9/1988 | Speakman | 29/90.01 |
| 4,956,991 | 9/1990 | Noonan | 29/446 |

Primary Examiner—Lowell A. Larson
Assistant Examiner—Michael J. McKeon

[57] ABSTRACT

A hole is formed in a high-strength steel part and a lubricant consisting essentially of one or more metal powders, preferably of nickel or molybdenum; a metal powder which is more reactive than the steel of the workpiece such as zinc; and an organic medium is applied. A forming mandrel having a generally cylindrical shape with a frustoconical portion on either end is centered over the hole. The mandrel is pushed through the hole at a rate such that the steel adjacent the hole is coldworked and its microstructure is transformed from an austenitic to a normal tempered martensitic structure.

4 Claims, 3 Drawing Sheets

WORKHARDENING HIGH-STRENGTH STEEL AIRCRAFT COMPONENTS

This invention relates to a method of workhardening holes in high-strength steel aircraft components. More particularly, the method relates to enlarqinq and coldworking holes in aircraft flaptracks.

BACKGROUND

Because of the relatively high weight of steel compared to aluminum alloys, steel is used only in those aircraft components where exceptional strength is required. One component conventionally made of ultra high-strength steel (270 to 300+ KSI) is the flaptrack. On the Boeing 737 aircraft, these tracks are additionally stiffened and reinforced by bolting a reinforcing plate along the length of the hockey-stick-shaped flaptrack. The holes for the bolts are workhardened before the plate is attached.

In the past, holes in high-strength steel members were coldworked by predrilling the hole to a size slightly smaller than the finished hole. A lubricant was then applied to the hole surface and baked for several hours or a split-ring sleeve was inserted in the predrilled hole. An oversized mandrel was pulled up through the baked lubricant or split sleeve.

While the results of this process were, for the most part, satisfactory, the cost was believed to be too high. Specially hardened tool steel mandrels were needed to work the ultra high-strength steel holes. However, the hardened mandrels broke frequently under tension, i.e., while they were being pulled through a workpiece, adding significantly to process cost. Furthermore, the split in the pull-up sleeve ring would results in creation of a ridge in the coldworked hole. This ridge had to be cold worked a second time with an oversized mandrel if the ridge was excessive.

Another cost factor was that any substantial deviation in the process, such as a mandrel breaking or a sleeve being misaligned in the hole, required that a hole be reworked to accommodate an oversized bolt.

U.S. Pat. No. 2,185,483 to Ward shows a method of hardening forged or cast holes in manganese steel work pieces by pushing a steel pin through the hole. Australian Patent No. 136,701 shows a method of making tubular wrought metal fixtures by pushing a tapering die member through a supporting seat in the work piece. U.S Pat. No. 3,270,410 shows the use of a tapered bore in aircraft component parts which are put under permanent compression by inserting a right circular cylindrical fastener in the tapered hole. U.S. Pat. No. 3,434,327 to Speakman shows a method of coldworking holes to exceed the materials elastic limit and then allowing the displaced material to rebound to approximately one-half of the amount the material was originally displaced.

U.S. Pat. No. 4,129,028 shows the use of stress waves to work a hole to a desired shape and finish. U.S. Pat. No. 4,649,728 shows cold forging or cold rolling a tube over its entire length to reduce the outside diameter and maintain the inside diameter, and U.S. Pat. No. 4,771,627 shows stress coining holes to relieve stress concentration in the wall of the hole using a vibrating tool.

While the aforementioned patent publications each relate to working holes in metal workpieces, none teaches or suggests a method that was found to be acceptable in the working of holes in high-strength steel aircraft component parts. Accordingly, applicants developed a novel and cost-effective method of doing so which shall be described in greater detail in the brief summary the several figures and the detailed description which follow.

BRIEF SUMMARY

In accordance with a preferred practice of the invention, a hole is drilled in a forged, high-strength steel part. A lubricant consisting essentially of one or more metal powders, Preferably of nickel or molybdenum; a metal powder which is more reactive than the steel of the workpiece such as zinc; and an organic medium is provided. The lubricant is applied to the hole to be worked. A forming mandrel having a generally cylindrical shape with a frustoconical portion on either end is centered over the hole. The mandrel is pushed through the hole at a rate such that the steel adjacent the hole is worked and its microstructure is transformed from an austenitic to a normal tempered martensitic structure.

FIGURES

DETAILED DESCRIPTION

Figure 1:
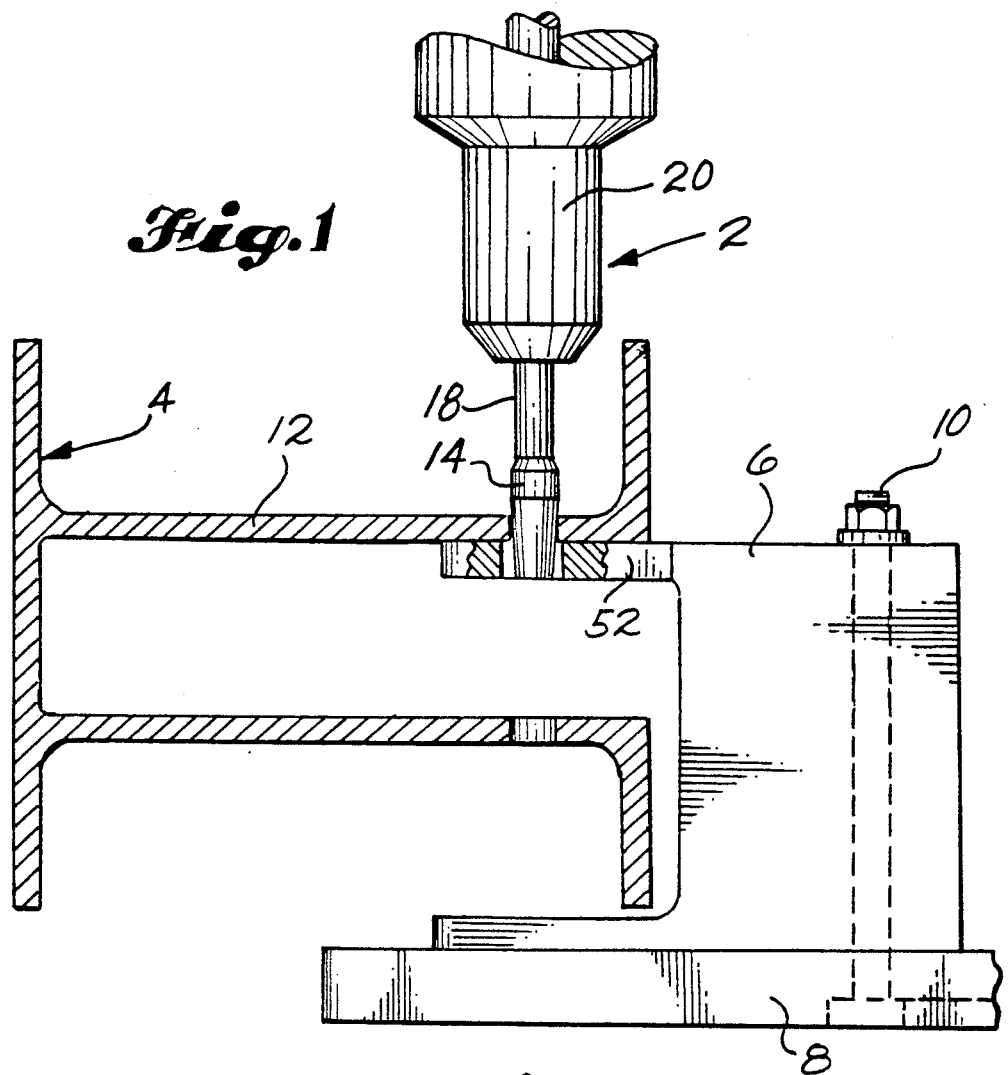
FIG. 1 is a side view, partially in section, of a fixture for coldworking predrilled holes in a workpiece, here a portion of a flaptrack.

In accordance with a preferred embodiment and referring to FIG. 1, an apparatus 2 for coldworking holes in a flaptrack 4 is shown. The apparatus comprises an anvil 6 which is secured to base 8 by bolt 10. Anvil 6 has base extension 8 which supports top track 12 of flaptrack 4. Mandrel 14 is shown is extending through hole 16 drilled in top track 12. Mandrel 14 is pushed by ram 18 of hydraulic press 20.

Figure 2:
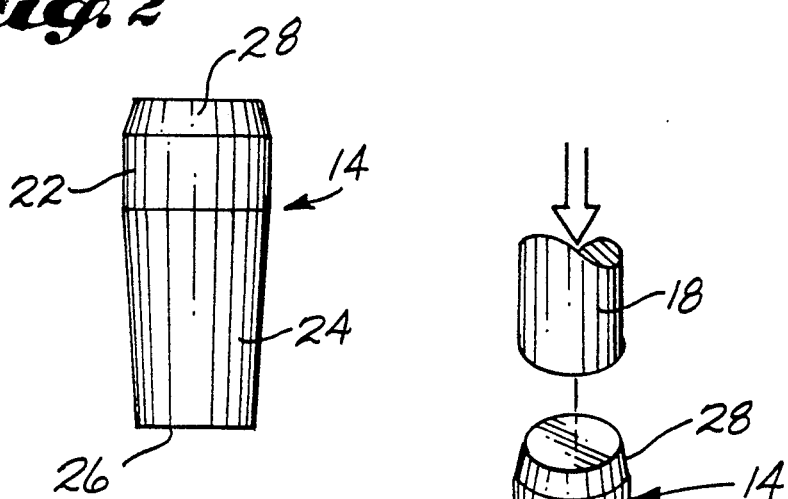
FIG. 2 is a side view of a mandrel for workhardening holes in ultra high-strength steel.

FIG. 2 shows mandrel 14 in greater detail. Mandrel 14 has a generally right circular cylindrical shape with a maximum diameter in center portion 22 which diameter is substantially equal to the desired finish diameter of a hole to be coldworked. Entry end 24 of mandrel 14 has a frustoconical shape, bottom tapered end of which 26 is smaller than the diameter of a predrilled hole to be coldworked. Exit end 28 of mandrel 14 is also tapered inwardly and has a frustoconical shape.

An advantage of the subject invention is that a mandrel 14 is pushed rather than pulled through the workpiece and may be formed of a less expensive material than high-strength tool steel. For example, a preferred mandrel material is carbide.

Figure 3:
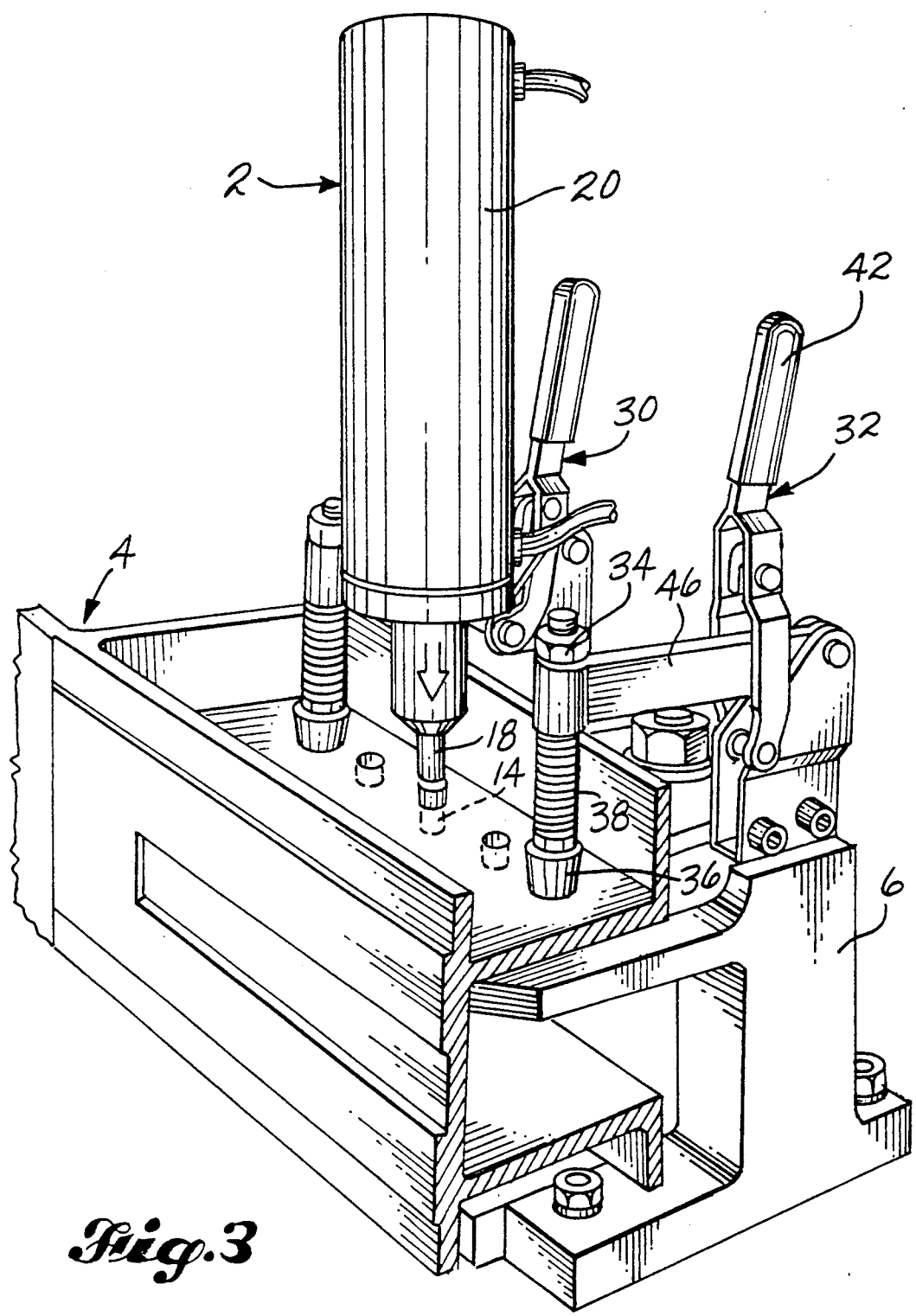
FIG. 3 is a perspective view of an apparatus for coldworking holes in an aircraft flaptrack including holddowns, anvil, and press.

FIG. 3 shows a more detailed view of an apparatus for coldworking holes 16 in web 12 of flaptrack 4. Hold-down mechanisms 30 and 32 are used to secure flaptrack workpiece 4 firmly against anvil 6 and to prevent any motion of workpiece 4 during the coldworking process. Hold down 32 comprises a finger 34 with rubber end 36 biased by spring 38 in fixture arm 40. When lever 42 is pulled down, rubber end 36 seats against the web 12 of flaptrack 4, preventing any motion of workpiece 4 as a hole 16 is coldworked by mandrel 14.

Mandrel 14 is pushed through hole 16 in web 12 by ram 18 at a rate of at least about two inches per minute and preferably in the range of from about two to ten inches per minute. Ram 18 is driven by press 20.

Figure 4:
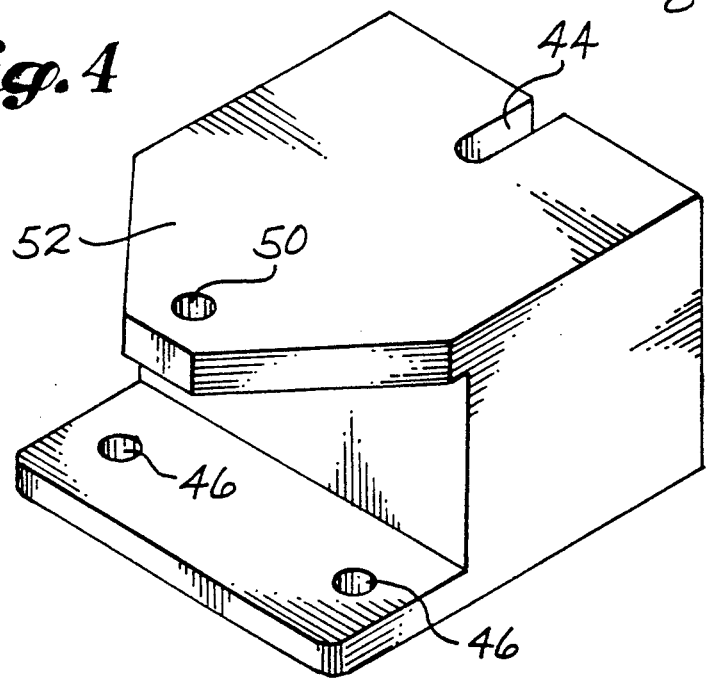
FIG. 4 is a perspective view of an anvil used to support a workpiece while it is being coldworked.

FIG. 4 shows anvil 6 in greater detail. Hole 50 of anvil 6 is located directly under a hole 16 to allow the mandrel to be pushed through. Holes 46 are provided in base 48 of mandrel to fixture it to machine base 8. Similarly, slot 44 is provided in workplate 52 of anvil 6 to secure it to the press 2.

Figure 5:
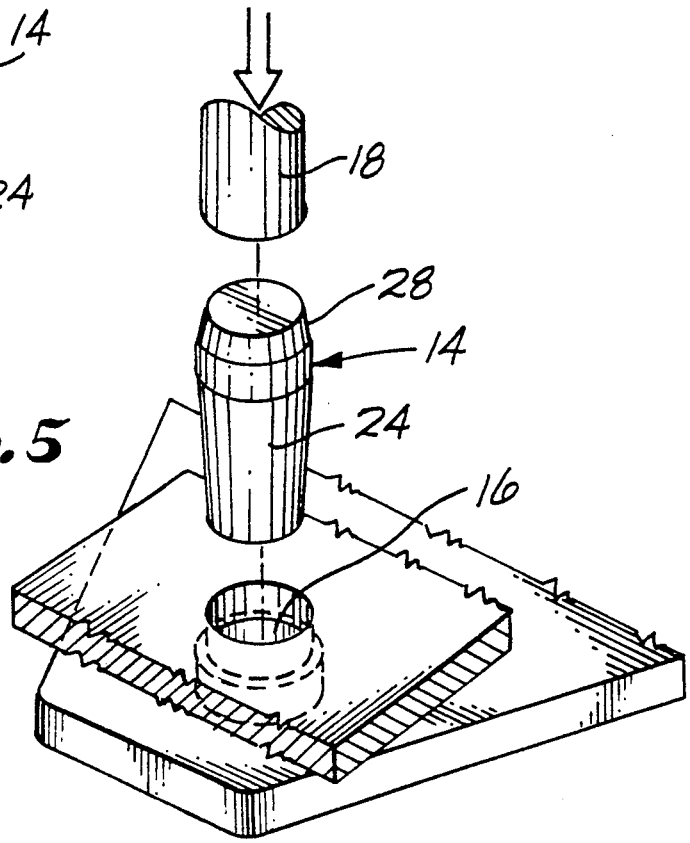
FIG. 5 is an exploded view of a workpiece, mandrel, ram and anvil portions of a coldworking apparatus in a position preparatory to coldworking the workpiece.
Figure 6:
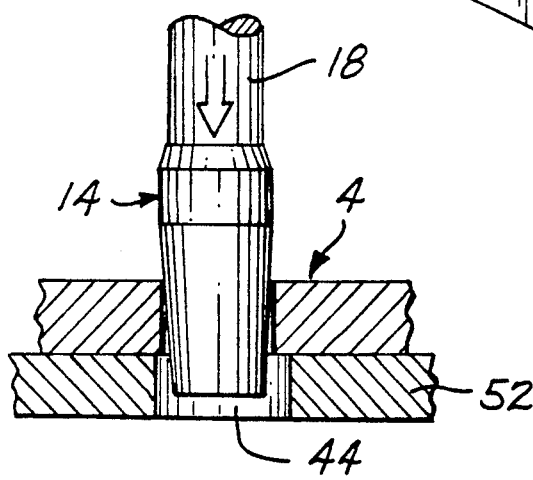
FIG. 6 shows the mandrel as it is being pushed through a workpiece.
Figure 7:
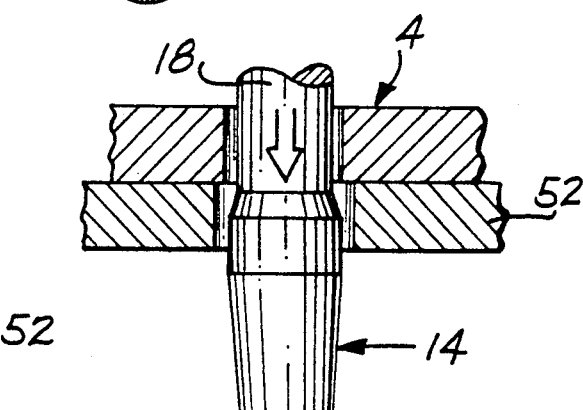
FIG. 7 shows the mandrel after it has been pushed through a workpiece.

FIGS. 5 through 7 show greater detail of mandrel 14 being pushed through workpiece 4. FIG. 5 shows an exploded view of the mandrel relative to the workpiece and ram before hole 16 is coldworked. FIG. 6 shows how the tapered entry end 24 of mandrel 14 seats in hole 16 after it is centered over hole 16 and pushed part way through by ram 18. As seen in particular in FIG. 7, as ram 18 is pushed farther down, center portion 22 of mandrel 14 forms the finished diameter of hole 16 by working the metal immediately adjacent the mandrel. Mandrel 14 is easily removed from workpiece 4 as its exit end 28 is also tapered to a smaller diameter than center 22 of mandrel 14.

In accordance with the preferred practice of the invention and with reference to the several figures, a hole is drilled in a workpiece 4 that has a diameter less than the desired finished diameter of the coldworked hole 16. A lubricant is applied to the working surface of the hole, preferably at least surrounding the entire surface of the hole 16 where mandrel 14 enters it.

A preferred lubricant consists essentially of one or more powders of relatively corrosion resistant metals such as copper, nickel or molybdenum. A second metal powder is provided which is more chemically reactive than the steel of the workpiece to act as a sacrificial metal to prevent corrosion of the worked hole. A preferred metal powder for this application is zinc powder. These metal powders are then dispersed in a medium such as grease or silicone to make them easy to apply.

After a hole 16 has been lubricated, a forming mandrel 14 is located and centered over a hole and pushed through at a rate such that the metal immediately adjacent the hole is coldworked. This transforms the austenitic microstructure of the high-strength steel to a normal tempered martensitic structure which is resistant to wear when a fastener is inserted through the workhardened hole.

EXAMPLE 1

Test plates were fabricated from 4340 modified heat-treated high-strength steel having a Rockwell Hardness of 50 to 56. The test plates were 0.375 inches thick and several holes 5/16th inch in diameter were drilled in each test plate. Each hole was lubricated by swabbing on Never Seez Blue Moly TM lubricant. Mandrels slightly larger than the holes and shaped as shown in the several figures were fabricated from Kennametal KF 310 carbide. The mandrels were pushed through the test plates with a Tinius-Olson tester. Push force and rate were monitored.

Hole roundness measurements were taken on a Moore Measuring Machine. These test results showed no elongated form in the coldworked holes. Surface finish of the holes ranged from about 5 to 60 RHR.

Metallographic examination of the coldworked holes showed a normal tempered martensitic microstructure approximately 0.001" deep from the hole surfaces. Microhardness testing showed a Rockwell equivalent hardness of 58-59 from the hole surface to 0.010" below the hole surface. This is a workhardened zone caused by the coldworking process. The base material adjacent the hole was measured to have a hardness of HRC 54-55. No microscopic cracking nor shear band formation was found in the material surrounding the coldworked holes.

EXAMPLE 2

Mandrel life tests were conducted on four each ¼", 5/16" and ⅜" maximum diameter mandrels which were used to push through 0.375" thick 4340 steel as set forth in Example 1 above. Each mandrel was pushed through 150 holes. At every tenth hole, the starting diameter, final hole diameter, major mandrel diameter at two places and push force were recorded. The testing was done on the Tinius-Olson tester.

At 150 holes, no wear was measured on any of the mandrels. One 5/16" diameter mandrel failed after 140 holes, this failure being attributed to the mandrel being misaligned with the ram. Before breakage, this mandrel had shown no signs of wear or any unusual increases in push force.

EXAMPLE 3

Holes were coldworked in four 737 model airplane flaptracks. Two flaptracks had two ⅜" inch diameter holes and fifty-eight 5/16" diameter holes per flaptrack. The other two flaptracks had forty-six 5/16" diameter holes and twenty ¼" diameter holes per flaptrack. The flaptracks received from the manufacturer with pilot holes drilled therein. Because these flaptracks had been heat treated prior to coldworking, the holes were reamed to remove heat-treating scale.

The holes were coldworked as set forth in Example 1 using press equipment like that shown in the several figures in lieu of the Tinius-Olson tester. The mandrel was sized to result in final hole diameters 0.004" to 0.005" larger than the starting hole diameters.

When coldworking one 5/16th" diameter hole, the coldworking process was purposely stopped half way through the hole. When the process resumed, no unusually large loads were required to get the mandrel moving and no other problems were encountered. All holes were coldworked to size the first time regardless of the thickness of the material in the flaptrack which ranged from 0.1" to 0.36".

While our invention has been described in terms specific embodiments thereof, other forms may be readily adapted by one skilled in the art. Accordingly, the scope of our invention is to be limited only in accordance with the following claims.

What is claimed is:

1. A method of enlarging and workhardening holes in high strength steel aircraft components, the method comprising
   forming a hole having a diameter less than the desired finish diameter;
   applying a lubricant to the working surfaces of said hole, said lubricant consisting essentially of a first powder taken from the group of nickel and molybdenum powders; a second powder which consists essentially of one or more metals that is more reactive than the steel of said component; and a spreadable medium in which said first and second powders are dispersed;

centering a forming mandrel over said hole, said mandrel having a cylindrical shape, a maximum diameter substantially equal to the desired finish diameter of said hole and a frustoconical shape on either end; and pushing said mandrel through said hole at a rate such that a normal tempered martensitic structure is obtained in the steel immediately adjacent said hole.

2. A method of enlarging and workhardening holes in high strength steel structural components, the method comprising forming a hole having a diameter less than the desired finish diameter;

applying a lubricant to the working surfaces of said hole, said lubricant consisting essentially of a first powder taken from the group of nickel and molybdenum powders; a second powder which consists essentially of one or more metals that is more reactive than the steel of said component; and a spreadable medium in which said first and second powders are dispersed;

centering a forming mandrel over said hole, said mandrel having a cylindrical shape, a maximum diameter substantially equal to the desired finish diameter of said hole and a frustoconical shape on either end; and pushing said mandrel through said hole at a rate of at least about two inches per minute such that the steel immediately adjacent said hole is coldworked and hardened.

3. A method of enlarging and workhardening holes in ultra high strength steel aircraft components, the method comprising forming a hole having a diameter less than the desired finish diameter;

applying a lubricant to the working surfaces of said hole, said lubricant consisting essentially of a first powder taken from the group of nickel and molybdenum powders; a second powder which consists essentially of one or more metals that is more reactive than the steel of said component; and an organic medium in which said first and second powders are dispersed;

centering a carbide-forming mandrel over said hole, said mandrel having a cylindrical shape, a maximum diameter substantially equal to the desired finish diameter of said hole and a frustoconical shape on either end; and pushing said mandrel through said hole at a rate of at least about two inches per minute such that the steel immediately adjacent said hole is enlarged, coldworked and its Rockwell Hardness is increased by at least about 2.5 points as compared with the steel hardness prior to said coldworking.

4. A method of enlarging and workhardening holes in high strength flaptracks for aircraft, the method comprising drilling a hole having a diameter less than the desired finish diameter;

applying a lubricant to the working surfaces of said hole, said lubricant consisting essentially of a first powder taken from the group consisting of nickel and molybdenum powders; a second zinc powder; and an organic medium in which said powders are dispersed;

centering a carbide-forming mandrel over said hole, said mandrel having a cylindrical shape, a maximum diameter substantially equal to the desired finish diameter of said hole and a frustoconical shape on either end; and pushing said mandrel through said hole at a rate at least about two inches per minute such that the Rockwell Hardness of the steel immediately adjacent said hole is increased by at least about 2.5 points as compared with the steel hardness prior to said coldworking.

* * * * *